Patented Oct. 30, 1945

2,387,774

UNITED STATES PATENT OFFICE 2,387,774

HOT MELT COATING COMPOSITION

Martin Salo and Harold F. Vivian, Rochester, N. Y., assignors to Eastman Kodak Company, Rochester, N. Y., a corporation of New Jersey No Drawing. Application November 27, 1943, Serial No. 512,052

8 Claims. (Cl. 106—178)

This invention relates to coating compositions, said compositions being suitable for application in a molten condition known as hot-melts.

Cellulose derivative compositions have been employed heretofore in the coating of paper, cloth, metal and the like by dissolving in an organic solvent and forming a layer upon the surface to be coated whereupon the solvent was evaporated. Although this method has found quite extensive use, it has involved the handling of organic solvents and solvent recovery systems to reclaim the vapors which are given off from the coating. Also these coating methods have necessitated a long period of curing thereby adding to the complexity of the process.

Other methods of coating have been suggested such as by lamination or by applying a hot melt to a surface. For the hot melt coating procedure, some compositions have been recommended but in none of these compositions have organic acid esters of cellulose been used to any substantial extent, particularly where the acyl of the cellulose ester was composed of lower fatty acid radicals. With many of the hot melt coating compositions there have been various features which were undesirable such as tackiness, extraordinary softness, opaqueness, brittleness or the like and consequently for the application of cellulose ester coatings volatile solvent solutions are still employed for various purposes.

One object of our invention is to provide a novel composition which is of value as a non-blocking melt coating composition to make possible the coating of surfaces without the use of a volatile solvent. Another object of our invention is to provide a practicable melt coating composition which gives hard moisture-proof coatings which are free of tackiness, brittleness and opaqueness. A further object of our invention is to provide a cellulose ester composition which can be used for melt coating purposes at temperatures such as 170° C. or below, which will not have a derogatory effect on paper. A still further object of our invention is to provide a composition which, in use, in melt coating operations goes through a gel state at a fairly high temperature such as 130-140° C. characterized by sudden setting which is highly desirable in obtaining a valuable product.

We have found that all of the characteristics set out may be obtained in compositions which are specifically limited as to the type of cellulose ester, the plasticizers employed and the proportions of the various materials which are present. We have found that compositions of high butyryl butyric acid esters of cellulose as prescribed herein mixed with di-2-ethyl hexyl phthalate and butyl stearate in certain proportions exhibit highly desirable properties for melt coating purposes in contrast to the commonly held opinion as regards cellulose ester compositions for melt coating purposes. The compositions of our invention essentially consist of high butyryl cellulose esters of a certain limited type mixed with a minor proportion of a mixture of di-2-ethyl hexyl phthalate and butyl stearate as will be described in more detail hereinafter.

The cellulose esters which form one of the constituents of the compositions in accordance with our invention are cellulose esters having a butyryl content of at least 42% and which have been hydrolyzed no more than a small extent. It is preferred that the esters will have been hydrolyzed to a small extent to increase their heat stability. However, generally the cellulose esters should have not more than two hydroxyl groups per 24 carbon atoms. If the ester is substantially a triester, it is necessary that it be a stable cellulose compound. The cellulose esters which have been found to be most suitable for use in accordance with our invention are those cellulose esters having at least 42% butyryl, the remainder of the acyl being acetyl. Ordinarily the presence of not more than 10% of acetyl is desired. If any other acyl than butyryl is employed, it is desirable that it be present in a sufficiently small amount that it does not influence the character of the cellulose ester. The cellulose ester may be a cellulose butyrate, a cellulose acetate butyrate, a cellulose propionate butyrate or a cellulose acetate propionate butyrate or perhaps even a few percent of some acyl groups higher than butyryl may be present providing the groups other than acyl are not present in an amount sufficient to substantially influence the character of the cellulose ester. The butyric acid esters of cellulose which are suitable for forming the compositions in accordance with our invention take in but a very small portion of the field of butyric acid esters of cellulose. It is preferable that the acyl groups present in the ester are substantially those of fatty acids of no more than four carbon atoms, which esters will be referred to herein as "lower fatty acid esters of cellulose."

The butyric acid esters of cellulose which are suitable for use in the compositions of our invention are still further restricted as to various other characteristics. The butyric acid esters which are useful for our compositions must have a melting point of less than 200° C., a char point of at least 260° C. and preferably 300° C. and a fundamental cuprammonium viscosity of not more than 10 centipoises and preferably of not more than five centipoises. The esters which are suitable for use in melt coating compositions in accordance with our invention have an acetone viscosity within the range of 5–200 centipoises, this being the viscosity of one part of ester dissolved in nine parts of acetone at a temperature of 25° C. To aid in the selection of the cellulose ester having optimum properties in a melt coating composition, it may be stated that with the cellulose esters having butyryl contents in the lower part of the range given, such as from 42 to 46% butyryl, the best results are obtained with those esters which have little or no hydroxyl therein but the esters must be heat stable. With esters of this butyryl content, compositions having the best fluidity are obtained with the near fully esterified type esters.

The relative proportion of di-2-ethyl hexyl phthalate and butyl stearate in the composition depends upon the butyryl content of the cellulose ester employed. For instance, with esters in the lower part of the butyryl range given, di-2-ethyl hexyl phthalate should be present in greater amount than butyl stearate whereas with esters in the higher butyryl portion of the range given it is desirable that the butyl stearate be present in greater proportion than the di-2-ethyl hexyl phthalate. In the intermediate portion of the range, some variation is permissible. For example, with the use of a butyric acid ester of cellulose having a butyryl content of 42–44% the ratio of dibutyl sebacate to butyl stearate may be 4 to 1 or even up to 6 to 1 whereas with a butyric acid ester of cellulose having a butyryl content of 55% the ratio of di-2-ethyl hexyl phthalate to butyl stearate may be 1 to 4 or even 1 to 6. Ordinarily it is desirable for optimum properties that the ratio of di-2-ethyl hexyl phthalate to butyl stearate be from 4 to 1 on the lower end of the butyryl content range of the cellulose ester to approximately 1 to 4 on the upper end of the butyryl content range. In the middle portion of the range such as with a butyryl content of 47 to 50%, the ratio of di-2-ethyl hexyl phthalate to butyl stearate may range from $\frac{3}{2}$ to $\frac{1}{4}$ to give products without any tendency towards tackiness. Obviously in cases where a slight tendency to tackiness is not objectionable, a more liberal range is permissible than in cases where even the least suggesion of tackiness is undesirable.

The test employed to determine the degree of tackiness was to place the coatings face to face at 75° C. for 17 hours using a pressure of 4.5 pounds per square inch. Satisfactory freedom from tackiness was considered freedom from any sticking whatever in this test. If a ratio of 4 to 1 of di-2-ethyl hexyl phthalate to butyl stearate is employed in the lower part of the described butyryl range, up to 1 to 4 in the upper part of the range and intermediate values are employed for intermediate esters, satisfactory freedom from tackiness is obtained.

In compositions in accordance with our invention, the ratio of the cellulose ester to the mixture of di-2-ethyl hexyl phthalate and butyl stearate, which mixture may be referred to as plasticizer, is found within the range of 1 to 1 to 4 to 1, (or 100% to 25% plasticizer based on the weight of the cellulose ester) the object being to obtain a composition having a fluidity for coating at a reasonable temperature, that is about 170° C. or below. The amount of plasticizer necessary is best determined by the acetone viscosity of the cellulose ester being used as a criterion, the higher viscosity esters needing more plasticizer or, in lieu thereof a higher temperature for the coating operation. As melting temperatures around 160° C. or 170° C. are the most desirable for melt coating operations, ordinarily with the higher viscosity esters a higher proportion of plasticizer will be used. This is especially true for the coating of paper in which a temperature of about 170° C. is the maximum which can be used without breakdown or some other effect upon the paper sheet. For the guidance of anyone performing the melt coating operation, it may be stated that with an ester having a 200 centipoise acetone viscosity either the ratio of ester to plasticizer should be approximately 1 to 1 or otherwise a higher coating temperature such as 200–210° C. is necessary. Such a higher temperature is unsuitable for the coating of paper but may be employed for the coating of materials such as metal or cloth which will not be deteriorated by those temperatures. If a 100 centipoise acetone viscosity cellulose ester is employed, the ratio of ester to plasticizer may be 7 to 3. Obviously, if desired, a greater proportion of plasticizer could be employed but usually it is preferred that the amount of plasticizer used be kept to a minimum. With an ester of this viscosity, a composition of four parts of ester to one of plasticizer could be employed provided the coating operation was carried out at a temperature higher than 160–170° C. With the esters in the lower part of the range of acetone viscosity such as 5 or 10 centipoises, the composition may be made up of four parts of ester to one part of plasticizer without using a high temperature for coating. If ane desires to employ an elevated temperature, the proportion of plasticizer could even be less. It is also desirable to keep the temperature for the operation down to aid in the stability of the composition in the melt coating operation. For instance, if the composition is kept at a temperature of 170° C. for a matter of 8 to 10 hours, or possibly longer, in some cases some discoloration or detrimental effect may occur, although with esters of good stability and high char point this hazard is reduced to a minimum. This effect may also be guarded against if desired by adding a very small proportion of an antioxidant such as hydroquinone to the composition. Because of the fact that the composition is subjected to an elevated temperature, sometimes for a long period of time, it is desirable that the composition be free of any material which will discolor or decompose in the use to which the composition is put.

The compositions in accordance with our invention may be obtained by mixing the cellulose esters in comminuted form into the mixture of di-2-ethyl hexyl phthalate and butyl stearate at a temperature of about 150–170° C. It is preferred that the cellulose ester be finely divided such as may be obtained by a ball milling operation. As intimate mixing of the cellulose ester and plasticizer is necessary, stirring is desirable in the formation of the composition. One procedure by which our composition may be made and used for melt coating is to intimately mix the cellulose ester with the plasticizer mixture followed by passing the resulting composition between heated rolls thereby causing a softening or melting together of the ingredients. After forming the sheet or film, it may then be broken up into small granules, which granules may be conveniently stored. For coating the granules are melted in a heated extrusion apparatus or heated mixing equipment of suitable design and fed into a melt coating machine particularly one which operates in a continuous manner. In this way the composition is not kept in a melted condition for a very long period of time prior to coating and it is, therefore, unnecessary to store large quantities of composition in a molten condition.

The result desired by the melt coating operation is to obtain a coated material in which the coating has a somewhat rigid structure. In this way a moisture-proof non-tacky sheet is obtained. As was pointed out above, our invention is particularly directed to enabling the melt coating of paper in which a temperature of not more than 170° C. must be employed for the coating operation. The paper which is coated may be either an ordinary paper such as kraft or a highly refined paper such as prepared from high α-cellulose.

The classical methods of coating devised for all types of viscous coating compositions can be used with these hot melt compositions provided the apparatus can be heated to the point necessary to keep the melt adequately fluid. The coating methods can be classed into four categories, namely, the knife, the roll, the casting, and extrusion methods.

Roll coating, which to date seems the most practical for melt coating, can be divided into the following types: contact, squeeze and rotogravure methods. In all of the roll coating methods the coating after application onto a web is in a rough form and must be polished or smoothed by a method such as passing the coated web over a heated bar of a special design or over a heated roll rotating in a direction opposite to that of the web or by ferrotyping under suitable conditions on a ferrotyping drum.

In the contact method of roll coating, a common design is one which employs two heat rolls rotating in opposite directions, one above the other, the lower one of which picks up the molten composition from a heated hopper and meters it to the top roll over which the web is passed; the coating is thus picked up by the web, which in turn passes over a smoothing apparatus such as a heated bar, following which the coated web passes over cooling rolls to harden the coating. The apparatus must be heated either with oil, Dowtherm, etc., or directly by electrical heaters. Coating apparatus of this type is described in U. S. Patents Nos. 2,070,563, 2,117,199, 2,117,200, 2,189,758, 2,190,843 and 2,214,787, of B. C. Miller and John Waldron Corporation. These machines can be adapted to squeeze roll coating by passing the web between the two coating rolls instead of over the top roll as in the contact coating method. With the squeeze roll method it is possible to coat both sides of the web simultaneously if the melt is provided for the top of the paper by a suitable hopper on the top roll and to the bottom roll by the regular hopper described in the contact method. In addition, smoothing apparatus for the back side must be provided.

The rotogravure method comprises applying the melt to the web from a heated intaglio roll which picks up the melt from a heated hopper. The excess melt is doctored from the roll prior to contact with the web which is squeezed against the intaglio roll by another roll. In this method it is also necessary to employ a smoothing apparatus of some kind or another. This melt coating apparatus is described in Beveridge-Marvellum Company U. S. Patents Nos. 2,312,927, 2,249,089, 2,163,712.

The cellulose esters which are employed in preparing our compositions are prepared by reacting upon cellulose with butyric anhydride, preferably after a presoaking or pretreatment with a small amount of acetic acid. For instance, by means of a pretreatment such as described and claimed in Malm specifications Serial Nos. 378,249 or 436,717 the cellulose is activated using only a small proportion of acetic acid. Esterification of this ester with butyric anhydride and catalyst such as by the method described and claimed in Blanchard Patent No. 2,304,792 or Malm applications Serial Nos. 435,071, filed March 17, 1942, and 479,460, filed March 17, 1943, results in a high butyryl cellulose ester. The ester may then be hydrolyzed preferably only for a sufficient time to reduce the sulfur content of the ester.

The cellulose esters which we prefer to use in compositions in accordance with our invention are those which have been stabilized. A method of stabilizing cellulose esters suitable for use here is described and claimed in Malm and Kirton Patent No. 2,250,201. The esters, after stabilizing in accordance with this process have a char point of at least 260° and usually approximately 300° or more and a melting point considerably below its char point. Compositions in accordance with our invention in which these esters are used may be subjected to melting temperatures for the time necessary to perform coating operations without detrimentally affecting the composition. It is desirable that little, if any, additional material be mixed with coating composition in accordance with our invention. Obviously, if colored coatings are desired, a very small proportion of dye might be incorporated. The following examples illustrate the use of our compositions for melt coating purposes.

*Example 1*

A melt was prepared by heating 2.7 pounds of di-2-ethyl hexyl phthalate and 1.8 pounds of n-butyl stearate to 160–180° C. followed by stirring in 13.5 pounds of cellulose acetate butyrate having a butyryl content of 47.7%, an acetyl content of 6.5% and a viscosity of 24.9 centipoises at 25° C. in a 10% solution in acetone. This melt was coated onto both sides of a photographic paper using a Waldron type melt coating machine. The coating was non-tacky and water-resistant.

*Example 2*

Example 1 was repeated except that the cellulose acetate butyrate employed had a butyryl content of 49.4%, acetyl content of 5.6% and a viscosity of 20 centipoises at 20° C. in a 10% solution in acetone. The resulting product was non-tacky and water-resistant.

*Example 3*

A mixture of 18 grams of n-butyl stearate and 18 grams of di-2-ethyl hexyl phthalate was heated to 160–180° C. and 70 grams of cellulose acetate butyrate having a butyryl content of 47.9%, an acetyl content of 6.1% and a viscosity of 110 centipoises was added thereto. This melt was coated onto a paper base using a melt coating machine. A non-tacky water-resistant coating was obtained.

Example 4

18 parts of di-2-ethyl hexyl phthalate and 12 parts of n-butyl stearate were heated to 160–180° C. and a cellulose acetate butyrate having a butyryl content of 48%, an acetyl content of 6.2% and a viscosity of 15 centipoises was stirred in. After a homogeneous melt was obtained, it was coated by means of a melt coating machine into baryta coated paper at a thickness of .005 inch, a paper was obtained having a non-tacky water-resistant surface.

Example 5

The preceding example was repeated except that 12 parts of the di-2-ethyl hexyl phthalate and 18 parts of n-butyl stearate were employed. The coated paper resulting therefrom had a smooth non-tacky water-resistant surface.

Example 6

The preceding example was repeated using 6 parts of di-2-ethyl hexyl phthalate and 24 parts of n-butyl stearate. A melt coated paper was obtained having a smooth non-tacky coating thereon.

We claim:

1. A non-blocking hot-melt coating composition essentially consisting of cellulose acetate butyrate having a butyryl content of at least 42%, not more than two hydroxyl groups per 24 cellulose carbon atoms, a melting point of less than 200° C., a char point of at least 260° C., a cuprammonium viscosity of not more than 10 centipoises and an acetone viscosity of 5–200 centipoises, an antioxidant, and 25–100% (based on the weight of the cellulose ester) of a mixture of di-2-ethyl hexyl phthalate and butyl stearate, the minor component of the mixture comprising at least 20% thereof, the composition being adapted when applied from a molten condition to give a non-tacky abrasion resistant coating.

2. A method of forming a protective coating on paper, which comprises applying to at least one of the surfaces of the paper a thin layer of a composition in molten fully fluid condition essentially consisting of a cellulose ester having a butyryl content of at least 42%, a melting point less than 200° C., a char point of at least 260° C., a cuprammonium viscosity of not more than 10 centipoises and an acetone viscosity of 5–200 centipoises and 25–100% (based on the weight of the cellulose ester) of a mixture of di-2-ethyl hexyl phthalate and butyl stearate, the minor component being present in an amount at least 20% of the mixture.

3. A non-blocking hot melt coating composition essentially consisting of cellulose acetate butyrate having a butyryl content of at least 42%, not more than two hydroxyl groups per 24 cellulose carbon atoms, a melting point of less than 200° C., a char point of at least 260° C., a cuprammonium viscosity of not more than 10 centipoises and an acetone viscosity of 5–200 centipoises, and 25–100% (based on the weight of the cellulose ester) of a mixture of di-2-ethyl hexyl phthalate and butyl stearate, the minor component of the mixture comprising at least 20% thereof, the composition being adapted when applied from a molten condition to give a non-tacky abrasion-resistant coating.

4. A non-blocking hot melt coating composition essentially consisting of cellulose acetate butyrate having a butyryl content of approximately 50%, not more than two hydroxyl groups per 24 cellulose carbon atoms, a melting point of less than 200° C., a char point of at least 260° C., a cuprammonium viscosity of not more than 10 centipoises and an acetone viscosity of 5–200 centipoises, and 25–100% (based on the weight of the cellulose ester) of a mixture of di-2-ethyl hexyl phthalate and butyl stearate, the minor component of the mixture comprising at least 20% thereof, the composition being adapted when applied from a molten condition to give a non-tacky, abrasion-resistant coating.

5. Paper having on at least one of its surfaces a melt-coating essentially consisting of a cellulose ester having a butyryl content of at least 42%, a melting point less than 200° C., a char point of at least 260° C., a cuprammonium viscosity of not more than 10 centipoises and an acetone viscosity of 5–200 centipoises and 25–100% (based on the weight of the cellulose ester) of a mixture of di-2-ethyl hexyl phthalate and butyl stearate, the minor component being present in an amount at least 20% of the mixture.

6. Paper having a coating thereon essentially consisting of cellulose acetate butyrate having a butyryl content of approximately 50%, a melting point of less than 200° C., a char point of at least 260° C., a cuprammonium viscosity of not more than 10 centipoises and an acetone viscosity of 5–200 centipoises and 25–100% (based on the weight of the cellulose ester) of a mixture made up of 3 parts of di-2-ethyl hexyl phthalate and 2 parts of butyl stearate forming a non-tacky abrasion-resistant coating upon the surface of the paper.

7. A non-blocking hot melt coating composition essentially consisting of cellulose acetate butyrate having a butyryl content of approximately 47–50%, not more than two hydroxyl groups per 24 cellulose carbon atoms, a melting point of less than 200° C., a char point of at least 260° C., a cuprammonium viscosity of not more than 10 centipoises and an acetone viscosity of 5–200 centipoises and 25–100% (based on the weight of the cellulose ester) of a mixture of di-2-ethyl hexyl phthalate and butyl stearate, the ratio of the former to the latter being within the range of three-halves to one-fourth, the composition being adapted when applied from a molten condition to give a non-tacky abrasion-resistant coating.

8. A non-blocking hot melt coating composition essentially consisting of 75 parts of cellulose acetate butyrate having a butyryl content of approximately 47%, not more than two hydroxyl groups per 24 cellulose carbon atoms, a melting point of less than 200° C., a char point of at least 260° C., a cuprammonium viscosity of not more than 10 centipoises, and an acetone viscosity of 5–200 centipoises, 15 parts of di-2-ethyl hexyl phthalate and 10 parts of butyl stearate, the composition being adapted when applied from a molten condition to give a non-tacky abrasion-resistant coating.

MARTIN SALO.
HAROLD F. VIVIAN.